Aug. 30, 1927.

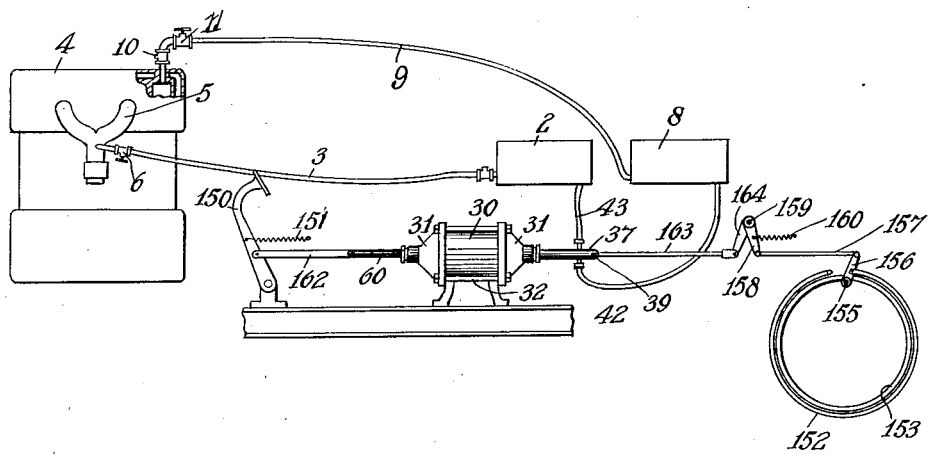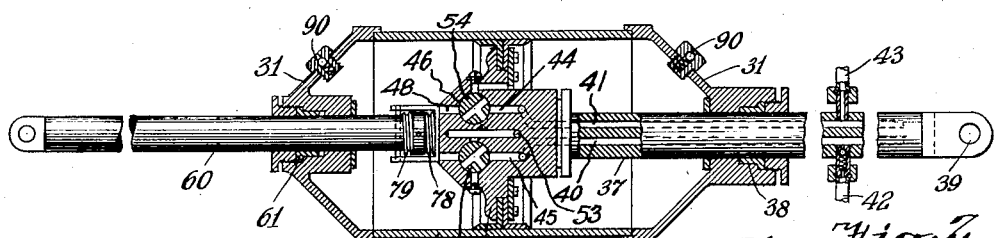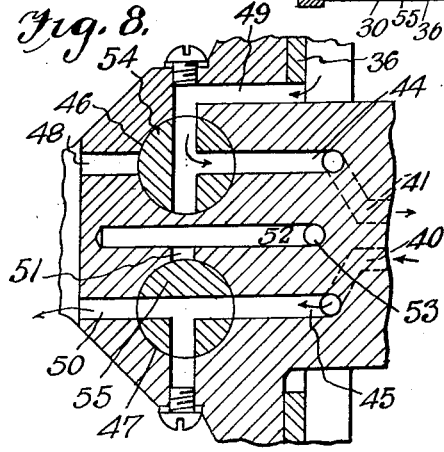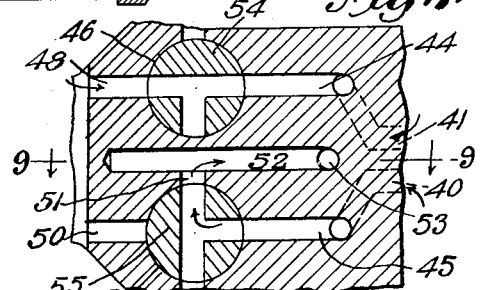

C. S. BRAGG ET AL 1,640,526

POWER ACTUATOR

Filed Nov. 6, 1924

INVENTORS
Caleb S. Bragg and
Victor W. Kliesrath
BY
Louis Prevost
ATTORNEY

Patented Aug. 30, 1927.

1,640,526

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

POWER ACTUATOR.

Application filed November 6, 1924. Serial No. 748,293.

Our invention consists in the novel features hereinafter described, reference being had to the accompanying drawings, which illustrate one embodiment of the same selected by us for purposes of illustration, and the said invention is fully disclosed in the following description and claims.

Our present invention consists in certain improvements in a power actuator which is particularly well adapted for use in connection with automotive vehicles for the operation of steering mechanism or the brake mechanism thereof, although it may be used for any desired purpose for which it may be found desirable, as for throwing clutches into and out of gear and operating steering mechanism, and other mechanism on motor boats, and for other purposes.

Our present invention consists in an improved power actuator provided with reversing valve mechanism including rotatably mounted valves, the construction and operation of which is clearly described herein and pointed out in the claims. In the accompanying drawings in which we have illustrated our invention, the actuator is shown connected with the brake mechanism of an automobile, but it is to be understood that it may be connected with the steering mechanism if desired, and it is so shown in our prior application for Letters Patent of the United States for improvements in steering gear, filed November 1, 1924, and given Serial No. 747,271.

Referring to the said drawings,

Fig. 1 is a diagrammatic view representing our improved actuator connected with the brake mechanism of an automotive vehicle and operatively connected with the suction passage of the engine, and with a source of pressure furnished by compressed gases from a cylinder of the engine.

Fig. 2 is a sectional view of our improved actuator.

Figs. 7 and 8 are views similar to Fig. 3, showing the valves in different positions.

Figure 3:
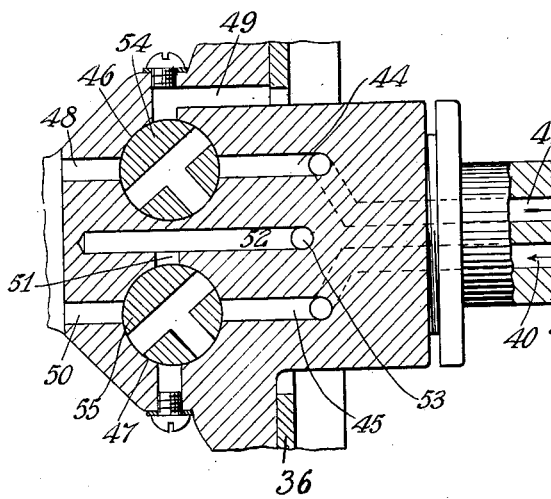
Fig. 3 is an enlarged sectional view of the reversing valve mechanism.

Referring to the drawings, 30, represents the actuator cylinder, provided with heads, 31, connected by bolts, 32. 36 represents the actuator piston, which is double acting, and is preferably provided with oppositely extending gaskets, as shown. 37 represents the piston rod which extends through a stuffing box, 38, at the rear end of the actuator cylinder, and has its rear end connected with the brake mechanism to be operated, in this instance by a pivot pin, 39. The actuator piston is provided with a reversing valve mechanism for controlling the admission and eduction of motor fluid. The actuator is operated by differential pressures, and in the installation herein shown these differential pressures are conveniently obtained from the internal combustion engine itself. For example, the eduction passage of the actuator may be connected with a suction passage of the engine between the throttle valve and the cylinders, as the intake manifold, while the inlet passage of the actuator is connected with the atmosphere, or the outlet passage may be connected with the atmosphere and the inlet passage connected with a source of compressed fluid obtained from an explosion chamber of the motor, or the inlet passage may be connected to such a source of compressed fluid from an engine cylinder and the outlet passage may be connected to the intake manifold so as to employ both pressure and suction, suitable storage tanks being provided in the pressure and suction line connections in such case as may be necessary, and as particularly pointed out in our former application for Letters Patent of the United States filed December 22, 1923, and given Serial No. 682,346.

In the present instance the piston rod is provided with an inlet passage, 40, and an outlet passage, 41, formed therein by drilling the piston rod longitudinally and the piston rod is provided outside of the cylinder with lateral apertures communicating respectively with passages, 40 and 41, to which are connected inlet pipe, 42, and outlet pipe, 43, which will extend to the sources of differential pressures which are to be used in the particular installation. If suction or vacuum is to be relied upon, the pipe, 43, is connected with the intake manifold of the engine, and the pipe, 42, with the atmosphere. If pressure from the engine cylinder were relied upon, the inlet pipe, 42, will be connected with a tank supplied with gases under pressure from the engine cylinder in a well known way. In the present instance we have shown, in Fig. 1, our improved actuator designed to be operated by both suction and pressure, but it will be understood that we may employ either, without the other, by connecting one or the other of the pipes, 42—43, with the atmosphere, so as to rely either upon vacuum acting in conjunction with the pressure of the atmosphere, or compressed fluid from the engine cylinder acting in conjunction with atmospheric pressure on the opposite side of the piston. In the present instance, the outlet pipe, 43, is shown as connected with a storage space represented by a tank or reservoir, 2, which is connected by a pipe, 3, with the suction passage of the engine, between the throttle valve and the cylinder, and conveniently to the intake manifold of an internal combustion engine, represented at 4, the manifold being indicated at 5. In order to secure the quick response of the actuator without delivering air exhausted therefrom into the manifold so rapidly as to interfere with the operation of the engine, the pipe, 3, leading from the tank, 2, is preferably provided with a regulating valve, or restricting device, indicated at 6, adjacent to the manifold, and the pipe, 3, is also provided with a suitable check valve, indicated at 7 to maintain the rarefied condition obtained in tank, 2. Where suction alone is relied upon, the inlet pipe, 42, will be connected with the atmosphere. In the present instance, however, the inlet pipe, 42, is connected to a pressure tank, 8, which is in turn connected by a pipe, 9, with one of the cylinders of the engine, a check valve, 10, and an adjustable pressure regulating valve 11 being inserted in pipe, 9, immediately adjacent to the engine cylinder to which pipe, 9, is connected. Obviously, if the pressure alone is relied upon, the suction tank, 2, and its connections with the manifold would be omitted, and the pipe, 43, would be connected to the atmosphere.

The central portion of the piston is provided with a passage, 44, and with a passage, 45, forming continuations respectively of the passages, 41 and 40, in the piston rod. In line with each of the passages, 44 and 45, is a conical valve seat, said seats being indicated at 46 and 47, respectively. The valve seat, 46, is provided with an outlet port, 48, opening on the forward side of the piston, and with an outlet port, 49, opening on the opposite or rearward side of the piston. The valve seat, 47, is provided with an inlet port, 50, communicating with the cylinder forward of the piston, and an inlet port, 51, communicating with the cylinder in rear of the piston by means of a longitudinal passage, 52, and a transverse or angular passage, indicated at 53. In the conical valve seats are located rotary three-way valves, indicated at 54 and 55, respectively, each of which is provided with a valve stem, 56, suitably mounted in the piston and provided with coil springs, 57, for holding the valves in their conical seats. Each of the valve stems is provided with a pinion, 58, for rotating it, said pinions meshing with racks, 59, on opposite sides of a valve actuating rod, 60, which extends through the forward head of the actuator cylinder through a stuffing box, 61, therein, and into the piston for actuating the rotary valve by longitudinal movement of the rod, 60, with respect to the piston. In Figs. 2 and 3, the rotary valves are shown in section in their neutral positions in which it will be noted that the outlet passage, 44, is not in communication with either of the outlet ports, 48 and 49, and the inlet passage, 45, is not in communication with either of the inlet ports, 50 or 51. Obviously when the valve is in this position, the actuator is inoperative. In the present instance, in which the actuator is connected with the braking mechanism of an automobile, we have shown for purposes of illustration, the actuator is connected between the operator operated devices or foot lever and connections therefrom to the brake mechanism. As shown, 150, represents the brake lever, which may be of any ordinary or usual construction and is provided with a retracting spring 151. The brake lever is connected by a link or rod, 162, with the valve actuating rod, 60, above referred to, for actuating this rod in either direction, the forward movement of the rod, 60, being secured by the forward movement of the foot, and its rearward movement being secured by the retracting spring, 151. The piston rod, 37, is here shown connected by a link, 163 with an arm, 164, mounted on a rock shaft, 159, and provided with arms, 158, connected by links, 157, with a lever, 156, pivoted at 155, and operatively connected with the opposite ends of a brake band, 152, for engaging a brake flange or drum, 153, secured to the rear wheels of the vehicle, for example, suitable retracting springs, 160, being provided if desired in connection with the arms, 158.

Figure 6:
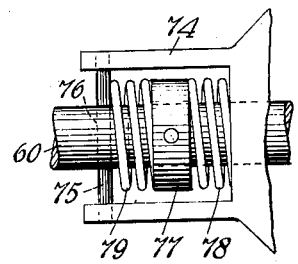
Fig. 6 is a detail sectional view of a part of the apparatus.

The valve actuating rod, 60, has a limited movement with respect to the piston, and is preferably provided with a pair of oppositely disposed springs interposed between the valve actuating rod, 60, and the piston, and normally tending to restore the rod, 60, and the rotary valves to their normal or neutral positions, and to maintain them at all times in such normal positions except when positively moved therefrom by the foot lever or other operator operated device. In the present instance, as shown in Fig. 6, for example, we have shown a pin, 75, extending through a sleeve or extension, 74, of the piston hub, surrounding the rod, 60, and through a slot, indicated at 76, in the rod, 60, itself to allow a limited longitudinal movement of the said rod 60, with respect to the piston. The piston is also shown provided with a collar, 77, and with oppositely disposed springs, 78—79, between said collar and the rear end of the sleeve recess on one side, and between the collar and the pin, 75, on the other, so that the pressure of these springs in opposite directions will tend to restore the valve mechanism to and hold it in neutral position. These springs also perform another function hereinafter pointed out.

Figure 5:
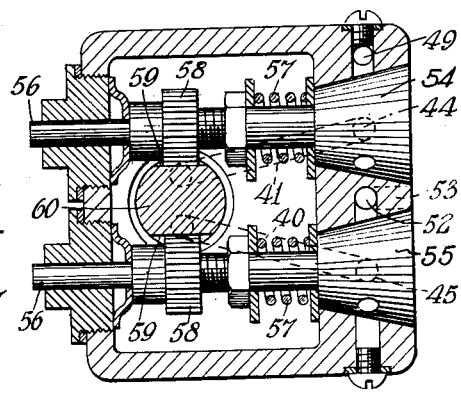
Fig. 5 is another section taken on the line 5—5 of Fig.4.
Figure 4:
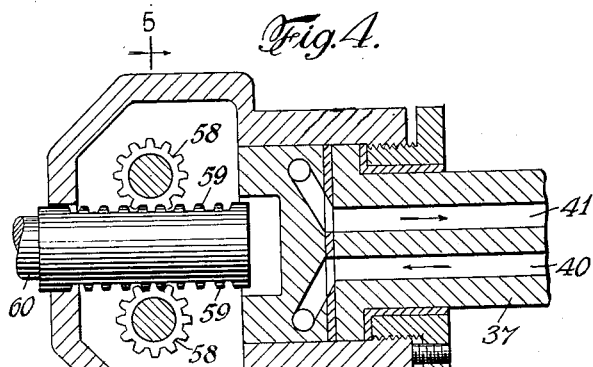
Fig. 4 is another section of the same.
Figure 9:
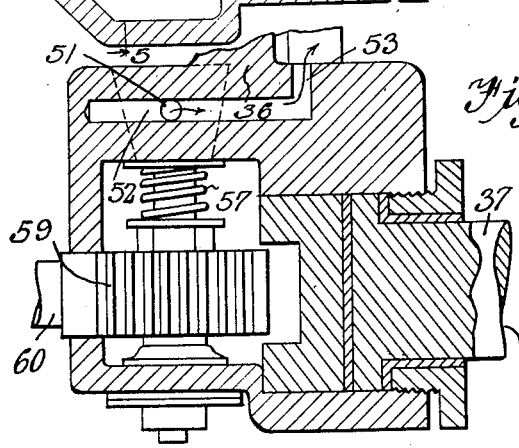
Fig. 9 represents a section on the line 9—9 of Fig. 7.

Referring now to Figs. 3, 4 and 5, it will be understood that if the valve rod, 60, is moved forwardly, the valve 54, will be rotated clockwise, so as to connect the outlet port, 48 with the passages, 44, 41 while the valve, 55, will be rotated counter-clockwise so as to connect the inlet port 50 with the inlet passage 52, 53, as indicated in Figs. 7 and 9, thus withdrawing air from the forward side of the piston and admitting higher pressure fluid in rear of the piston and thereby causing the movement of the piston forwardly in the same direction as the rod until the forward movement of the rod, 60, ceases, when the continued movement of the piston with respect to the rod effects the rotation of the valves back to their normal positions, this action being assisted by one of the springs, 78 and 79. If the valve rod, 60, is moved rearwardly, the valve, 54, will be rotated counter-clockwise so as to bring the outlet passage, 44, into communication with the outlet port, 49, the rotary valve, 55, being moved clockwise to bring the port, 50, into communication with the inlet passage, 45 as shown in Fig. 8, connecting the cylinder in rear of the piston with suction and admitting higher pressure fluid forward of the piston and thus effecting the actuation of the piston rearwardly in the same direction that the rod is moved. As soon as the actuating rod stops its rearward movement, the continued rearward movement of the piston will cause it to move relatively with respect to the rod, 60, and restore the valves to neutral position.

When the piston starts to move in either direction, there would ordinarily be a tendency for it to exert pressure on the rod in that direction, due to the frictional resistance on the valve mechanism, which might tend to carry the rod further than the operator desired. This tendency, however, is overcome and counteracted by the reaction of one or other of the springs, 78, 79, as one or other of these springs must of necessity be compressed whenever the rod, 60, is moved in either direction.

Should the power for operating the actuator fail under any conditions, or for any reason, it will be seen that the piston and the brake mechanism connected therewith can be directly operated from the foot lever in either direction as soon as the rod, 60, has moved far enough to take up the lost motion between it and the piston, in which positions the valves are set so as to prevent unrestricted movement of the piston in the desired direction, as for example, when the rod, 60, has been moved far enough to bring either end of the slot, 76, into contact with the pin, 75, in the construction illustrated herein. It is also to be understood that if at any time the power applied through the actuator is not sufficient to actuate the brakes to the desired extent, the operator, by pressing forwardly on the foot lever, so as to take up the lost motion between the rod, 60, and the piston, can add the pressure of his physical strength to that applied by the actuator, should that become necessary.

What we claim and desire to secure by Letters Patent is:—

1. In a power actuator, the combination with a cylinder and a piston movable therein, and means for producing differential pressures on opposite faces of the piston, of reversing valve mechanism including among its members valve seats located in said piston and provided with ports, rotary valves located in said valve seats, and valve actuating means including a longitudinally movable part extending through one end of the cylinder, and operatively connected with said valves, said longitudinally movable part being movable longitudinally with respect to the piston for effecting the rotary movement of said valves.

2. In a power actuator, the combination with a cylinder and a piston movable therein, and means for producing differential pressures on opposite faces of the piston, of reversing valve mechanism including among its members valve seats located in said piston and provided with ports, rotary valves located in said valve seats, a pinion connected with each of said valves, and a rack bar movable longitudinally with respect to said piston and engaging said pinions to effect the rotation of said valves.

3. In a power actuator, the combination with a cylinder closed at both ends, and a double acting piston therein, a piston rod connecting with the piston and extending through one end of the cylinder, and means for establishing differential pressures on opposite faces of the piston, of reversing valve mechanism comprising valve seats in said piston, and ports and passages communicating with said seats, and rotary valves engaging said seats and provided with gear members, and an actuating rod extending through the other end of the cylinder and into the piston and provided with rack teeth to engage the gear members of said valves, said rod being movable longitudinally with respect to the piston.

4. In a power actuator, the combination with a cylinder closed at its ends, a double acting piston therein, and means for producing differential pressures on opposite faces of the piston, of reversing valve mechanism comprising conical valve seats, and ports and passages communicating therewith, conical valves engaging said seats and provided with passages therethrough, means for holding said valves in engagement with their seats, an actuating rod extending through one end of the cylinder and into the piston and movable longitudinally with respect thereto and operative connections between said rod and said valves for rotating the latter.

5. In a power actuator, the combination with a cylinder closed at its ends, a double acting piston therein, and means for producing differential pressures on opposite faces of the piston, of reversing valve mechanism comprising conical valve seats, and ports and passages communicating therewith, conical valves engaging said seats and provided with passages therethrough, means for holding said velves in engagement with their seats, a gear member secured to each of said valves, an actuating rod extending through one end of the cylinder and into said piston between said gear members of said valves, said rod being moved longitudinally with respect to the piston and provided on opposite sides with racks to engage the gear members of said valves.

6. In a power actuator, the combination with a cylinder closed at its ends, a double acting piston therein, and means for producing differential pressures on opposite faces of the pistons, of reversing valve mechanism comprising conical valve seats each provided with passages communicating with the cylinder on opposite faces of the piston, one of said valve seats being provided with an inlet passage, and the other being provided with an outlet passage, of a rotary three-way valve engaging each of said valve seats, and means movable longitudinally with respect to and independently of the piston for simultaneously rotating said valve.

7. In a power actuator, the combination with a cylinder closed at its ends, a double acting piston therein, and means for producing differential pressures on opposite faces of the piston, of reversing valve mechanism comprising conical valve seats, each of said valve seats being provided with passages communicating with the cylinder on opposite faces of the piston, and one of said valve seats being provided with an inlet passage and the other being provided with an outlet passage, of a rotary three-way valve engaging each of said valve seats, an actuated part connected with the piston, and an actuating part movable longitudinally with respect to and independently of the piston, and operatively connected with said valves for effecting their joint rotation.

8. In a power actuator, the combination with a cylinder closed at its ends, a double acting piston therein, and means for producing differential pressures on opposite faces of the piston, of reversing valve mechanism comprising conical valve seats, each of said valve seats being provided with passages communicating with the cylinder on opposite sides of the piston, and one of said valve seats being provided with an inlet passage and the other being provided with an outlet passage, of a rotary three-way valve engaging each of said valve seats, a piston rod extending through one end of the cylinder, an actuated part connected therewith, an actuating part movable longitudinally with respect to the piston, extending through the other end of the cylinder and provided with racks and pinions connected to said valves and engaging said racks.

9. In a power actuator, the combination with a cylinder closed at its ends, a double acting piston therein, and means for producing differential pressures on opposite faces of the piston, of reversing valve mechanism comprising a pair of valve seats located in the piston, each provided with passages communicating with the cylinder on opposite sides of the piston, a piston rod extending through one end of the cylinder and provided with separate inlet and outlet passages, one of which communicates with each of said valve seats, a rotary valve engaging each of said valve seats, a valve actuating part extending through one end of the cylinder and movable longitudinally with respect to and independently of the piston, said valve actuating part being operatively connected with said valves for rotating them when said part is moved longitudinally with respect to the piston.

10. In a power actuator, the combination with a cylinder closed at its ends, a double acting piston therein, and means for producing differential pressures on opposite faces of the piston of reversing valve mechanism comprising a pair of valve seats located in the piston, each provided with passages communicating with the cylinder on opposite sides of the piston, a piston rod extending through one end of the cylinder and provided with separate inlet and outlet passages, one of which communicates with each of said valve seats, a rotary valve engaging each of said valve seats, a valve actuating part extending through the other end of the cylinder and operatively connected with said valves, said part being longitudinally movable with respect to and independently of the piston to effect the rotary movement of said valves.

11. In a power actuator, the combination with a cylinder closed at its ends, a double acting piston therein, and means for producing differential pressures on opposite faces of the piston, of reversing valve mechanism comprising a pair of valve seats located in the piston, each provided with passages communicating with the cylinder on opposite sides of the piston, a piston rod extending through one end of the cylinder and provided with separate inlet and outlet passages, one of which communicates with each of said valve seats, a rotary valve engaging each of said valve seats, a valve actuating part extending through the other end of the cylinder, and operatively connected with said valves, said valve actuating part being movable longitudinally with respect to and independently of the piston, and oppositely disposed springs interposed between said valve actuating part and the piston for normally holding the valves in a predetermined position.

12. In a power actuator, the combination with a cylinder closed at both ends, a double acting piston therein, and means for producing differential pressures on opposite faces of the piston, of reversing valve mechanism comprising a pair of valve seats located in the piston, each provided with passages communicating with the cylinder on opposite sides of the piston, an inlet passage connected with one valve seat, and an outlet passage connected with the other valve seat, a rotary valve engaging each of said valve seats, a longitudinally movable valve actuating part extending through one end of the cylinder and movable longitudinally with respect to and independently of the piston, said valve actuating part being operatively connected with said valves for rotating them when said actuating part is moved longitudinally with respect to the piston, and oppositely disposed springs interposed between said valve actuating part and the piston for normally maintaining the valves in a predetermined position.

In testimony whereof we affix our signatures.

CALEB S. BRAGG.
VICTOR W. KLIESRATH.